(12) United States Patent
Sasaki et al.

(10) Patent No.: US 10,052,989 B2
(45) Date of Patent: Aug. 21, 2018

(54) HEADREST DEVICE

(71) Applicant: NHK SPRING CO., LTD., Yokohama-shi (JP)

(72) Inventors: Yoshitaka Sasaki, Yokohama (JP); Yusuke Ohkawara, Yokohama (JP)

(73) Assignee: NHK Spring Co., Ltd., Yokohama-shi, Kanagawa (JP)

( * ) Notice: Subject to any disclaimer, the term of this patent is extended or adjusted under 35 U.S.C. 154(b) by 49 days.

(21) Appl. No.: 15/051,048

(22) Filed: Feb. 23, 2016

(65) Prior Publication Data
US 2016/0250952 A1    Sep. 1, 2016

(30) Foreign Application Priority Data
Feb. 26, 2015 (JP) ................................ 2015-036805

(51) Int. Cl.
*B60N 2/815* (2018.01)
*B60N 2/818* (2018.01)
*B60N 2/894* (2018.01)

(52) U.S. Cl.
CPC ............. *B60N 2/818* (2018.02); *B60N 2/815* (2018.02); *B60N 2/894* (2018.02)

(58) Field of Classification Search
CPC .. B60N 2/4808; B60N 2/4811; B60N 2/4814; B60N 2/4817; B60N 2/4879; B60N 2002/4894
USPC ....................................................... 297/410
See application file for complete search history.

(56) References Cited

U.S. PATENT DOCUMENTS

| | | | | |
|---|---|---|---|---|
| 3,151,911 A | * | 10/1964 | Eichorst ................ | B60N 2/882 297/397 |
| 4,099,779 A | * | 7/1978 | Goldner ................ | B60N 2/847 297/408 |
| 4,256,341 A | * | 3/1981 | Goldner ................ | B60N 2/838 297/410 |
| 4,671,573 A | * | 6/1987 | Nemoto ................ | B60N 2/818 297/410 |

(Continued)

FOREIGN PATENT DOCUMENTS

| | | | | |
|---|---|---|---|---|
| EP | 0770512 A1 | * | 5/1997 | .......... B60N 2/4817 |
| JP | S 61-128910 A | | 6/1986 | |

(Continued)

OTHER PUBLICATIONS

Office Action dated Jun. 12, 2018 in Japanese Application No. 2015-036805, 6 pgs.

*Primary Examiner* — Ryan D Kwiecinski
(74) *Attorney, Agent, or Firm* — Knobbe, Martens, Olson & Bear, LLP

(57) ABSTRACT

A headrest device comprising: a left and right pair of headrest stays that are fixed to a seatback frame in a state projecting out toward an upper side of a seatback of a vehicle seat; a headrest main body that has the pair of headrest stays inserted inside from a lower face of the headrest main body and that is supported by the pair of headrest stays; and a removal restricting mechanism that is provided inside the headrest main body, that restricts removal of the headrest main body from the pair of headrest stays, and that releases the restriction by a release operation portion positioned inside the headrest main body being press-operated from an outside of the headrest main body.

4 Claims, 17 Drawing Sheets

(56) References Cited

U.S. PATENT DOCUMENTS

| | | | | |
|---|---|---|---|---|
| 6,068,337 A * | 5/2000 | De Filippo | ............ | B60N 2/815 297/391 |
| 7,562,936 B1 * | 7/2009 | Veine | ............ | B60N 2/815 297/410 |
| 2004/0145228 A1 * | 7/2004 | Terrand | ............ | B60N 2/815 297/410 |
| 2005/0200185 A1 * | 9/2005 | Yokoyama | ............ | B60N 2/818 297/410 |
| 2006/0163931 A1 * | 7/2006 | Yamada | ............ | B60N 2/818 297/410 |
| 2006/0214491 A1 * | 9/2006 | Metz | ............ | B60N 2/815 297/410 |
| 2006/0284468 A1 * | 12/2006 | Tanaka | ............ | B60N 2/818 297/410 |
| 2007/0145804 A1 * | 6/2007 | Ichisugi | ............ | B60N 2/818 297/410 |
| 2007/0158990 A1 * | 7/2007 | Hermansson | ............ | B60N 2/847 297/408 |
| 2007/0170766 A1 * | 7/2007 | Brawner | ............ | B60N 2/844 297/408 |
| 2008/0296953 A1 * | 12/2008 | Veine | ............ | B60N 2/815 297/407 |
| 2009/0079250 A1 * | 3/2009 | Follesa | ............ | B60N 2/815 297/410 |
| 2009/0179474 A1 * | 7/2009 | Reel | ............ | B60N 2/815 297/391 |
| 2009/0184557 A1 * | 7/2009 | Runde | ............ | B60N 2/815 297/410 |
| 2009/0230739 A1 * | 9/2009 | Boes | ............ | B60N 2/815 297/220 |
| 2012/0080925 A1 * | 4/2012 | Steinmetz | ............ | B60N 2/815 297/391 |
| 2012/0126605 A1 * | 5/2012 | Gross | ............ | B60N 2/865 297/410 |
| 2012/0161490 A1 * | 6/2012 | Poehlmann | ............ | B60N 2/818 297/410 |
| 2013/0049430 A1 * | 2/2013 | Sobieski | ............ | B60N 2/4829 297/410 |
| 2013/0069412 A1 * | 3/2013 | Tscherbner | ............ | A47C 7/38 297/391 |
| 2014/0028072 A1 * | 1/2014 | Ronzi | ............ | B60N 2/812 297/410 |
| 2015/0028644 A1 * | 1/2015 | Hagan | ............ | B60N 2/809 297/410 |
| 2015/0076884 A1 * | 3/2015 | Martin | ............ | B60N 2/4249 297/391 |
| 2015/0145310 A1 * | 5/2015 | Jeong | ............ | B60N 2/4814 297/408 |
| 2015/0239377 A1 * | 8/2015 | Winkelbach | ............ | B21D 39/04 297/391 |
| 2016/0052430 A1 * | 2/2016 | Abe | ............ | B60N 2/80 297/410 |
| 2016/0082869 A1 * | 3/2016 | Takahashi | ............ | B60N 2/80 297/404 |
| 2016/0166064 A1 * | 6/2016 | Takahashi | ............ | B60N 2/4808 297/404 |
| 2016/0176324 A1 * | 6/2016 | Otto | ............ | B60N 2/809 297/391 |
| 2016/0243965 A1 * | 8/2016 | Hoffmann | ............ | B60N 2/815 |
| 2016/0250952 A1 * | 9/2016 | Sasaki | ............ | B60N 2/815 297/410 |
| 2016/0332545 A1 * | 11/2016 | Segura | ............ | H01R 13/631 |
| 2017/0088024 A1 * | 3/2017 | Hans | ............ | B60N 2/4817 |

FOREIGN PATENT DOCUMENTS

| | | |
|---|---|---|
| JP | 2006-520226 A | 9/2006 |
| JP | 2009-201533 A | 9/2009 |

\* cited by examiner

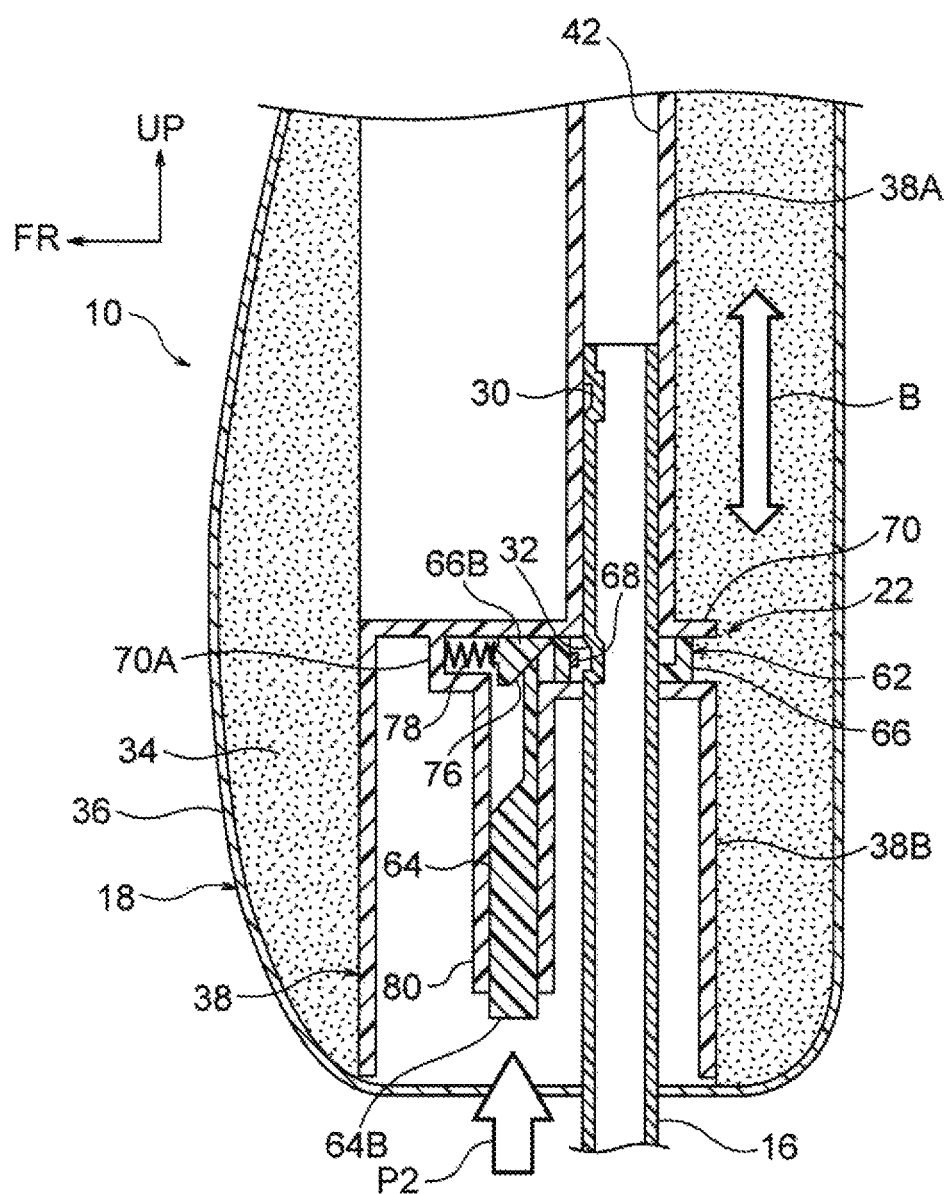

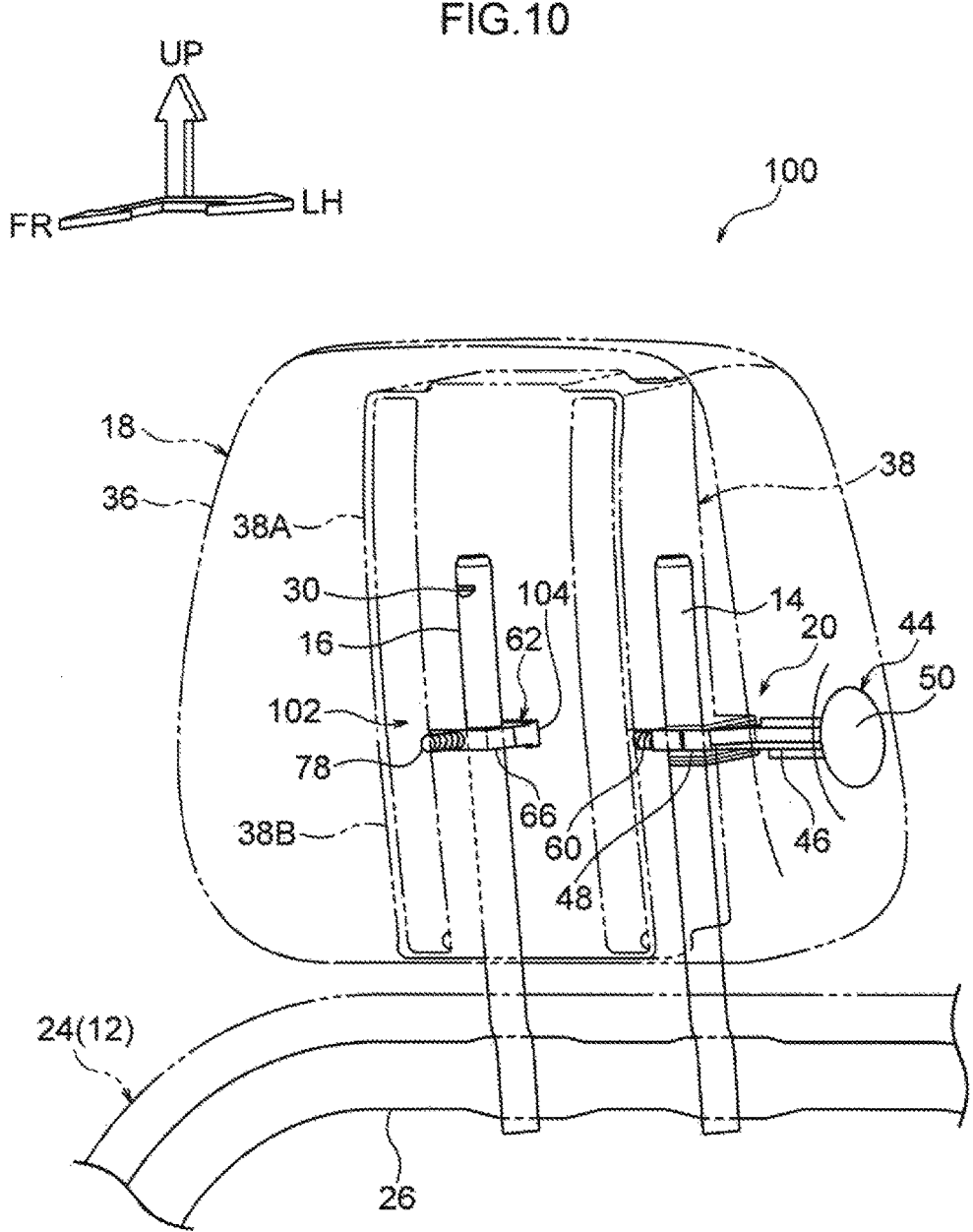

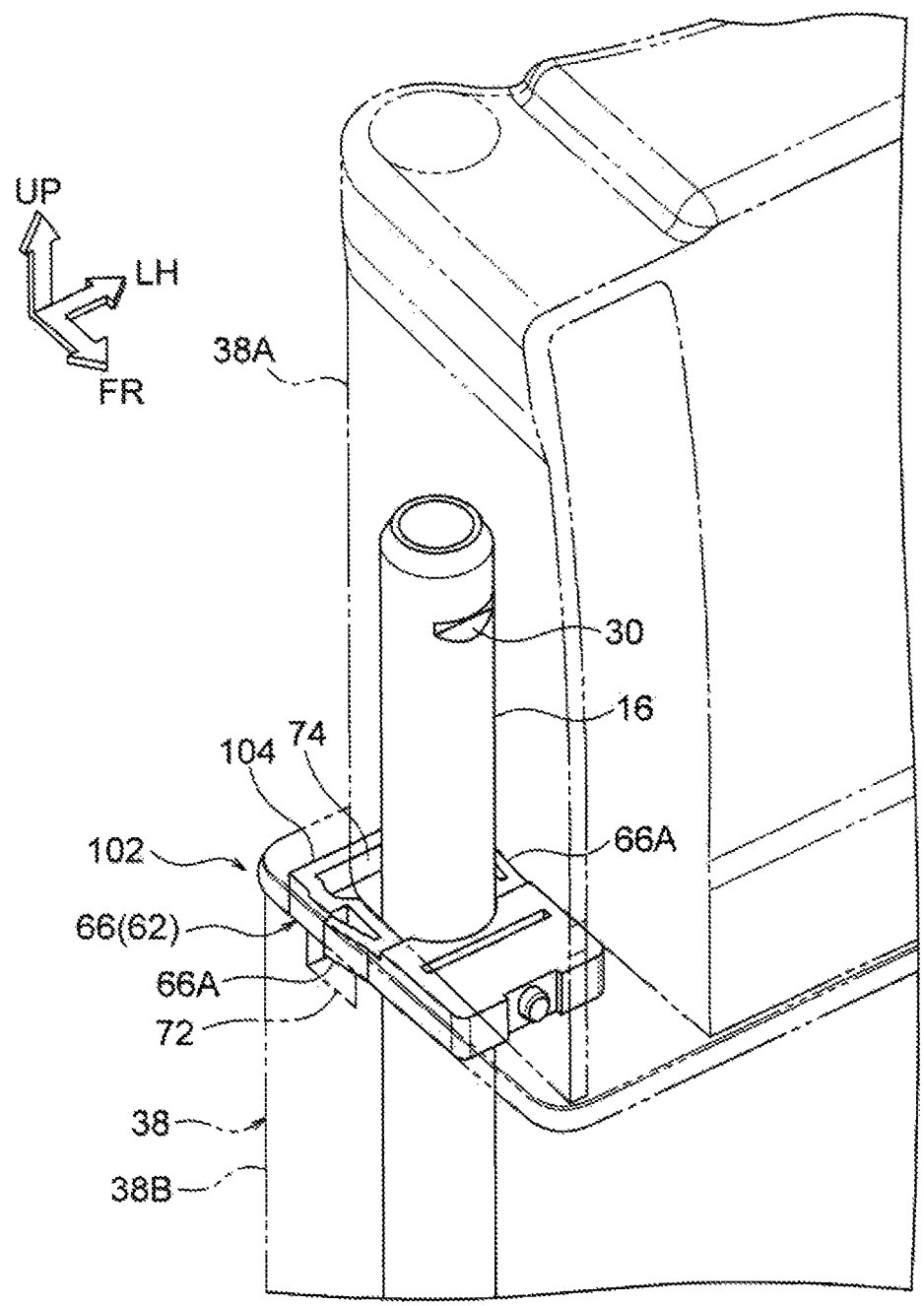

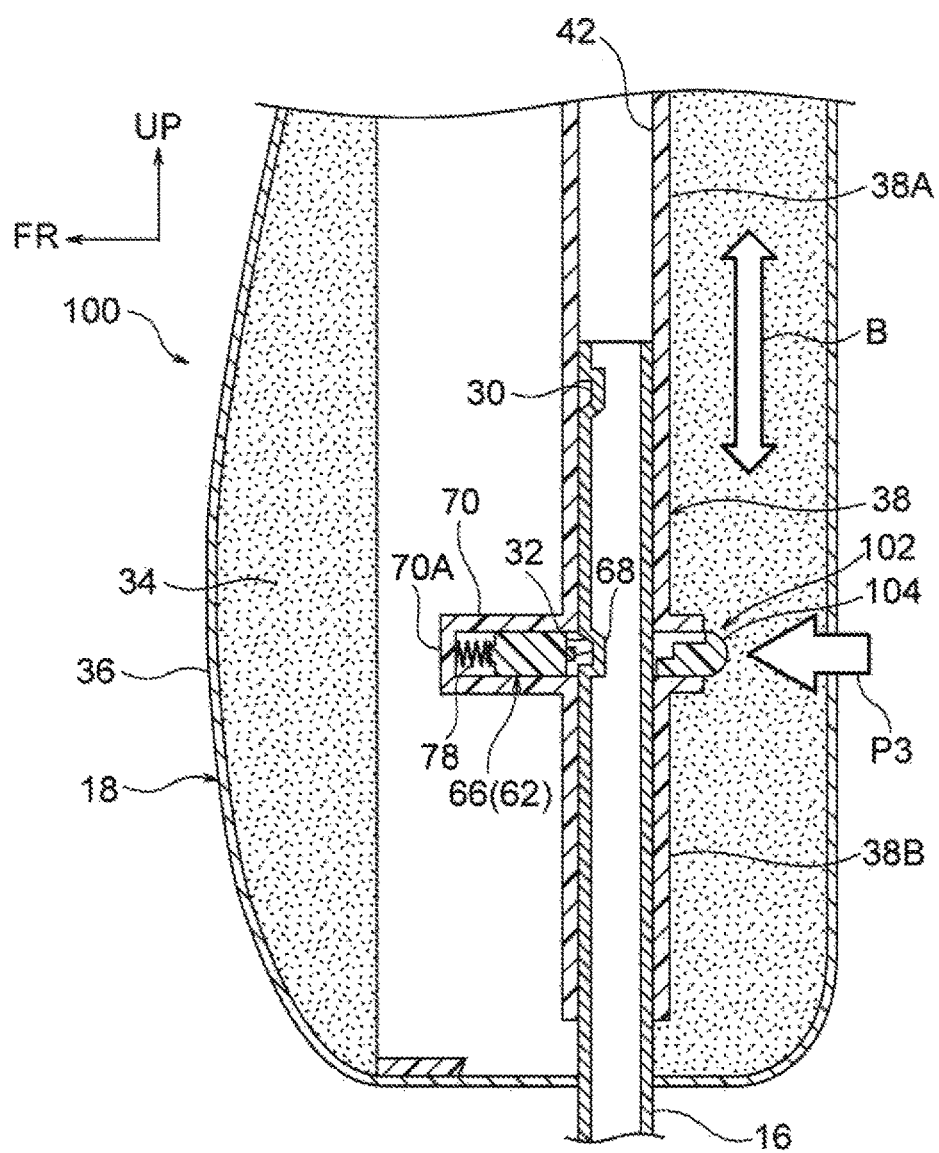

HEADREST DEVICE

CROSS-REFERENCE TO RELATED APPLICATION

This application is based on and claims priority under 35 USC 119 from Japanese Patent Application No. 2015-036805 filed on Feb. 26, 2015, the disclosure of which is incorporated by reference herein.

BACKGROUND

Technical Field

The present invention relates to a headrest device.

Related Art

A headrest (what is referred to as a one-touch headrest) described in Japanese Patent Application Laid-Open (JP-A) No. S61-128910 is configured such that a headrest main body is supported by a left and right pair of headrest stays that are fixed to a back frame of a seatback. Plural notches are formed in a row in the up-down direction to the left and right headrest stays, and a lock spring provided inside the headrest main body is selectively engaged with one of the plural notches. Configuration is thereby such that a height position of the headrest main body with respect to the left and right headrest stays can be adjusted. Note that the specifications of Japanese National-Phase Publication No. 2006-520226 and U.S. Pat. No. 6,068,337 also describe similar art.

In the headrest with the above configuration, supposing that the headrest main body was to be removed from the left and right headrest stays, this would result in a state in which the left and right headrest stays project upward from the seatback. A structure that restricts the removal of the headrest main body from the left and right headrest stays is sometimes provided inside the headrest main body such that a user does not use the seatback in such a state. However, providing such a removal restriction structure complicates a removal operation of the headrest main body during maintenance or the like.

SUMMARY

In consideration of the above circumstances, an object of the present invention is to obtain a headrest device that contributes to preventing removal of a headrest main body by a user and to securing ease of maintenance, in a configuration in which the headrest main body is supported by a left and right pair of headrest stays that are fixed to a seatback frame.

A first aspect of the present invention provides a headrest device comprising:

a left and right pair of headrest stays that are fixed to a seatback frame in a state projecting out toward an upper side of a seatback of a vehicle seat;

a headrest main body that has the pair of headrest stays inserted inside from a lower face of the headrest main body and that is supported by the pair of headrest stays; and a removal restricting mechanism that is provided inside the headrest main body, that restricts removal of the headrest main body from the pair of headrest stays, and that releases the restriction by a release operation portion positioned inside the headrest main body being press-operated from an outside of the headrest main body.

In the headrest device according to the first aspect of the present invention, the left and right pair of headrest stays are fixed to the seatback frame in a state projecting out toward the upper side of the seatback of the vehicle seat. The pair of headrest stays are inserted inside the headrest main body from the lower face of the headrest main body. The headrest main body is thereby supported by the pair of headrest stays. The removal restricting mechanism that restricts removal of the headrest main body from the pair of headrest stays is provided inside the headrest main body. In the removal restricting mechanism, the restriction is released by the release operation portion positioned inside the headrest main body being press-operated from the outside of the headrest main body. The headrest main body is accordingly capable of being removed from the pair of headrest stays, thereby contributing to securing ease of maintenance. Moreover, the release operation portion is positioned inside the headrest main body, thereby enabling the existence of the release operation portion to be made unnoticeable to a user. This contributes to preventing the headrest main body from being removed by a user.

A second aspect of the present invention provides the headrest device of the first aspect, wherein:

the removal restricting mechanism comprises a restricting member that restricts the removal of the headrest main body by engaging with one of the pair of headrest stays; and the restricting member is released from engagement with the one headrest stay by press-operation of the release operation portion.

In the headrest device according to the second aspect of the present invention, the removal restricting mechanism provided inside the headrest main body includes the restricting member. The restricting member restricts the removal of the headrest main body from the pair of headrest stays by engaging with the one of the pair of headrest stays. The restricting member is released from the engagement with the one headrest stay when the release operation portion positioned inside the headrest main body is press-operated from the outside of the headrest main body. The headrest main body is accordingly capable of being removed from the pair of headrest stays. Since the configuration is such that the restricting member engages with the one of the headrest stays in this manner, the structure can be made simpler than in a configuration in which the restricting member engages with both the headrest stays.

A third aspect of the present invention provides the headrest device of the second aspect, further comprising:

a height adjustment mechanism that is provided inside the headrest main body in order to adjust a height position of the headrest main body with respect to the pair of headrest stays, wherein:

the height adjustment mechanism comprises a limiting member that limits up-down movement of the headrest main body with respect to the pair of headrest stays by engaging with the other of the pair of headrest stays, and the engagement of the limiting member with the other headrest stay is released by an adjustment operation portion that is exposed to the outside of the headrest main body being press-operated.

In the headrest device according to the third aspect of the present invention, the height adjustment mechanism provided inside the headrest main body includes an adjustment member. The adjustment member limits up-down movement of the headrest main body relative to the pair of headrest stays by engaging with the other of the pair of headrest stays. The adjustment member includes the adjustment operation portion that is exposed to the outside of the headrest main body, and the engagement of the adjustment member with the other headrest stay is released when the adjustment operation portion is press-operated. Up-down movement of the headrest main body relative to the pair of headrest stays is thereby permitted, and the height position of the headrest main body can be adjusted. Since the configuration is such that the adjustment member engages with the other of the headrest stays in this manner, the structure can be made simpler than in a configuration in which the adjustment member engages with both the headrest stays.

A fourth aspect of the present invention provides the headrest device of the second aspect or third aspect, wherein:

the removal restricting mechanism comprises a release member having an upper end portion that engages with the restricting member and having a lower end portion that configures the release operation portion and is press-operated from a lower face side of the headrest main body.

In the headrest device according to the fourth aspect of the present invention, the removal restricting mechanism provided inside the headrest main body includes the release member. The upper end portion of the release member engages with the above-described restricting member, and the lower end portion of the release member configures the release operation portion. When the release operation portion is press-operated from the lower face side of the headrest main body, the restricting member, which is engaged with the upper end portion of the release member, releases the engagement with the other headrest stay. Since the configuration is such that the release operation portion is press-operated from the lower face side of the headrest main body in this manner, the release operation portion can be made difficult to be press-operated by a user.

A fifth aspect of the present invention provides the headrest device of the second aspect or third aspect, wherein:

a rear end portion of the restricting member configuring the release operation portion is press-operated from a back face side of the headrest main body.

In the headrest device according to the fifth aspect of the present invention, the rear end portion of the restricting member provided inside the headrest main body configures the release operation portion. When the release operation portion is press-operated from the back face side of the headrest main body, the engagement of the restricting member with the one headrest stay is released. Since the rear end portion of the restricting member configures the release operation portion in this manner, the structure of the removal restricting mechanism can be made simpler.

As explained above, the headrest device according to the present invention contributes to preventing the removal of the headrest main body by a user and to securing ease of maintenance, in a configuration in which the headrest main body is supported by the left and right pair of headrest stays that are fixed to the seatback frame.

BRIEF DESCRIPTION OF THE DRAWINGS

Exemplary embodiments of the present invention will be described in detail based on the following figures, wherein:

FIG. 9B is a vertical cross-section illustrating the engagement released state of the concealed lock and the right headrest stay;

FIG. 10 is a perspective view illustrating a headrest device according to a second exemplary embodiment of the present invention and part of a seatback frame;

FIG. 11A is a perspective view illustrating an engaged state of a concealed lock included in a removal restricting mechanism of a headrest device according to the second exemplary embodiment, and a right headrest stay;

FIG. 12B is a vertical cross-section illustrating the engagement released state of the concealed lock and the right headrest stay.

DETAILED DESCRIPTION

First Exemplary Embodiment

Explanation follows regarding a headrest device 10 according to a first exemplary embodiment of the present invention, with reference to FIG. 1 to FIG. 9B. Note that in each of the drawings as appropriate, the arrow FR indicates the front direction of a vehicle seat 12 configured including the headrest device 10, the arrow UP indicates the upper direction of the vehicle seat 12, and the arrow LH indicates the left direction of the vehicle seat 12. In the below explanation, unless specifically stated otherwise, simple reference to the front-rear, left-right, and up-down directions refers to directions with respect to the vehicle seat 12.

Configuration

Figure 1:
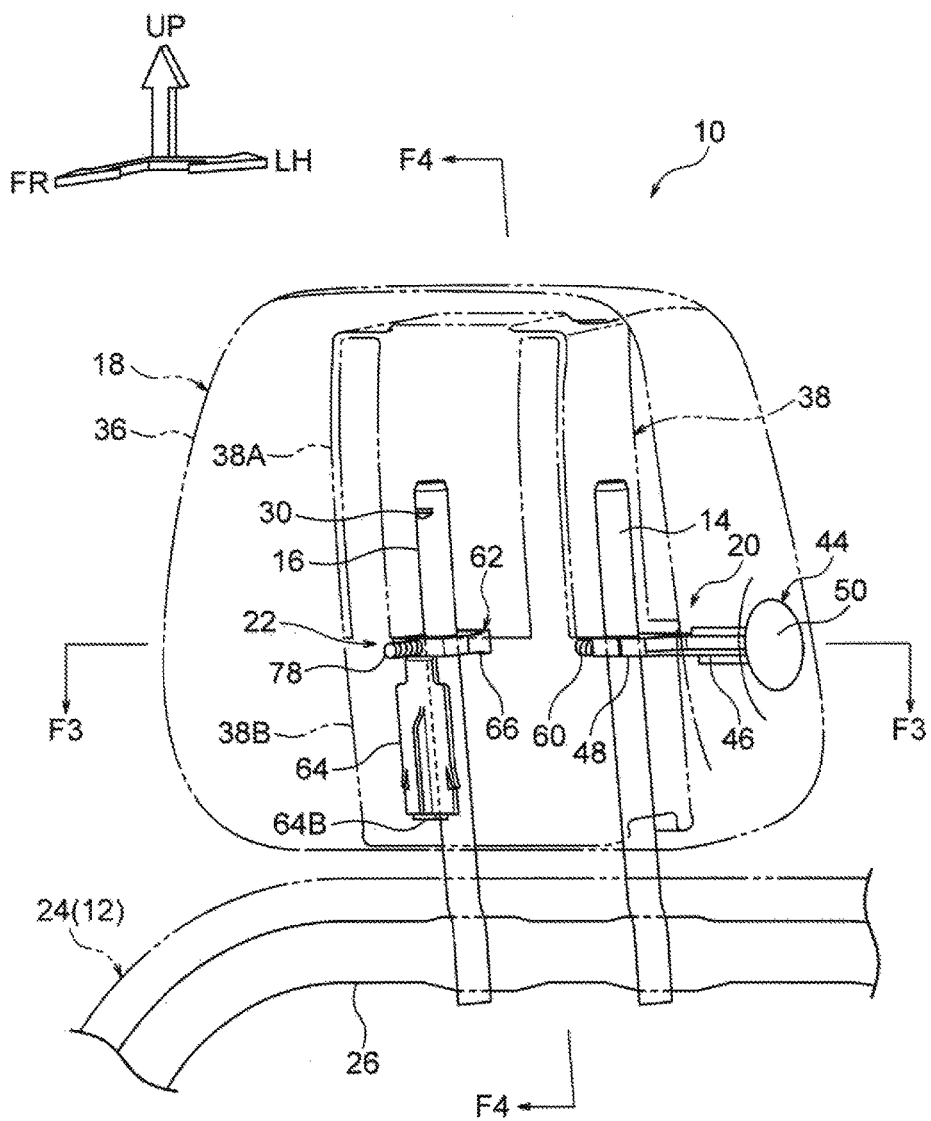
FIG. 1 is a perspective view illustrating a headrest device according to a first exemplary embodiment of the present invention and part of a seatback frame.

As illustrated in FIG. 1 to FIG. 4, the headrest device 10 includes a left and right pair of headrest stays 14, 16, a headrest main body 18, a height adjustment mechanism 20, and a removal restricting mechanism 22. As illustrated in FIG. 1, the headrest device 10 is provided above a seatback 24 of the vehicle seat 12, and is configured so as to support the head of an occupant seated in the vehicle seat 12.

The left and right headrest stays 14, 16 are formed by a metal pipe material, for example, and respective lower end portions are fixed to an upper end portion of a seatback frame 26 by a means such as welding. The headrest stays 14, 16 are disposed in a row along the seat left-right direction (seat width direction) oriented with their length direction (axial line direction) running along the height direction of the seatback 24, and project out toward the upper side of the seatback 24.

As illustrated in FIG. 5A to FIG. 7B, plural notches (recessed portions) 28 are formed in a row along the up-down direction to a seat right side face (seat width direction center side face) of the headrest stay 14 on the left side (hereafter sometimes referred to as "left headrest stay 14"). The notches 28 correspond to the height adjustment mechanism 20. As illustrated in FIG. 1, and FIG. 8A to FIG. 9B, an upper and lower pair of notches (recessed portions) 30, 32 are formed to a seat front side face of the headrest stay 16 at the right side (hereafter sometimes referred to as "right headrest stay 16"). The notches 30, 32 correspond to the removal restricting mechanism 22.

The headrest main body 18 includes a headrest pad 34 (not illustrated in the drawings, except in FIG. 3, FIG. 4, FIG. 9A, and FIG. 9B), a headrest cover (trim) 36, and a case 38. The headrest pad 34 is a foamed body of urethane foam or the like, and configures a cushion material of the headrest main body 18. The headrest cover 36 is formed by stitching a cloth material, leather, synthetic leather, or the like into a bag shape, and covers the surface of the headrest pad 34. The case 38 is formed overall with an elongated, substantially rectangular shaped body made of resin, for example, and is embedded inside the headrest pad 34 oriented with its length direction running along the up-down direction of the headrest main body 18.

Figure 2:
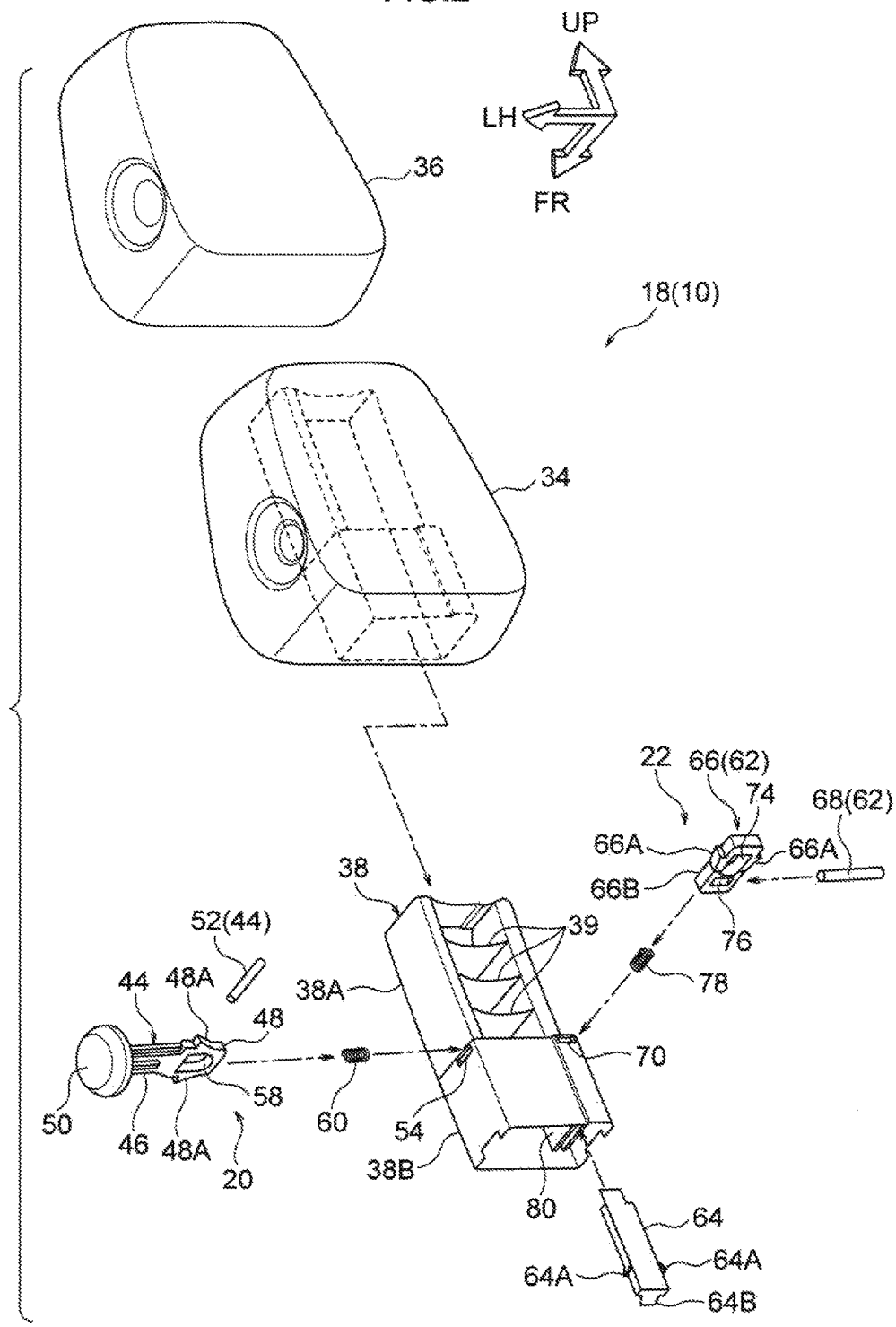
FIG. 2 is an exploded perspective view illustrating configuration of major portions of a headrest device according to the first exemplary embodiment.
Figure 3:
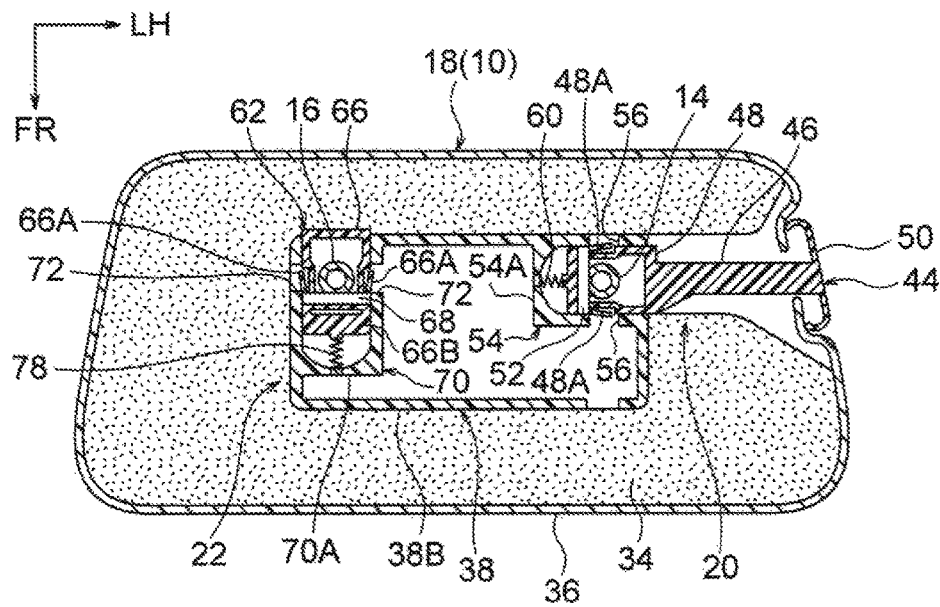
FIG. 3 is a lateral cross-section sectioned along line F3-F3 in FIG. 1.
Figure 4:
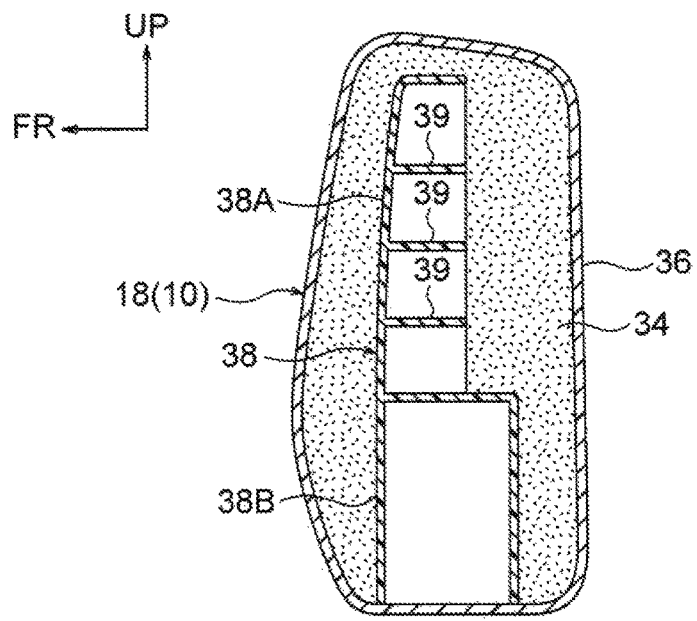
FIG. 4 is a vertical cross-section sectioned along line F4-F4 in FIG. 1.
Figure 5A:
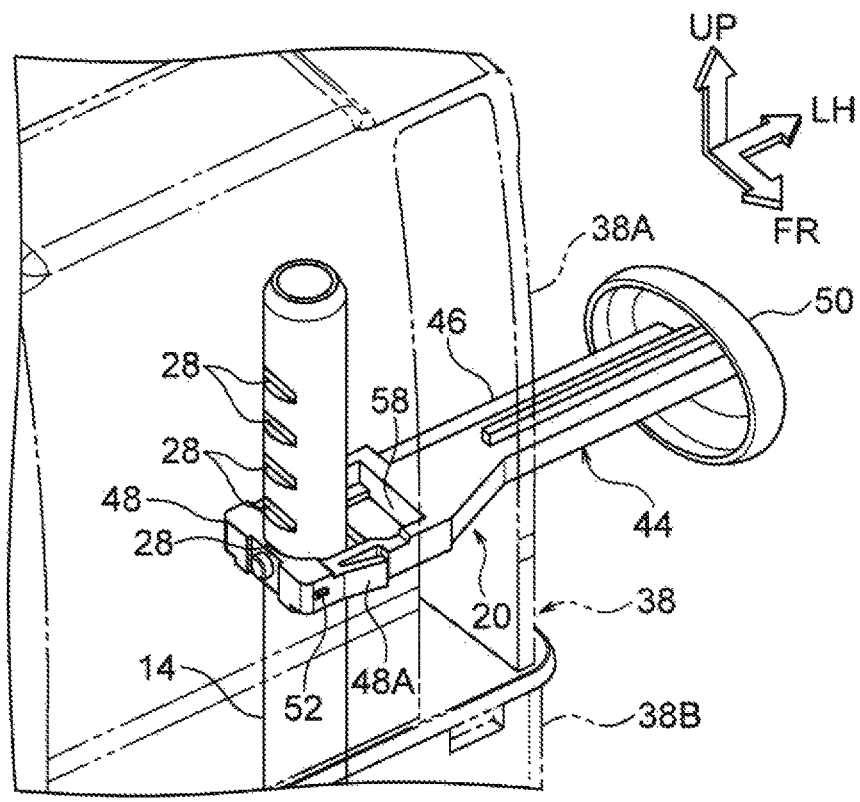
FIG. 5A is a perspective view illustrating an engaged state between an operating knob included in a height adjustment mechanism of a headrest device according to the first exemplary embodiment, and a left headrest stay.
Figure 5B:
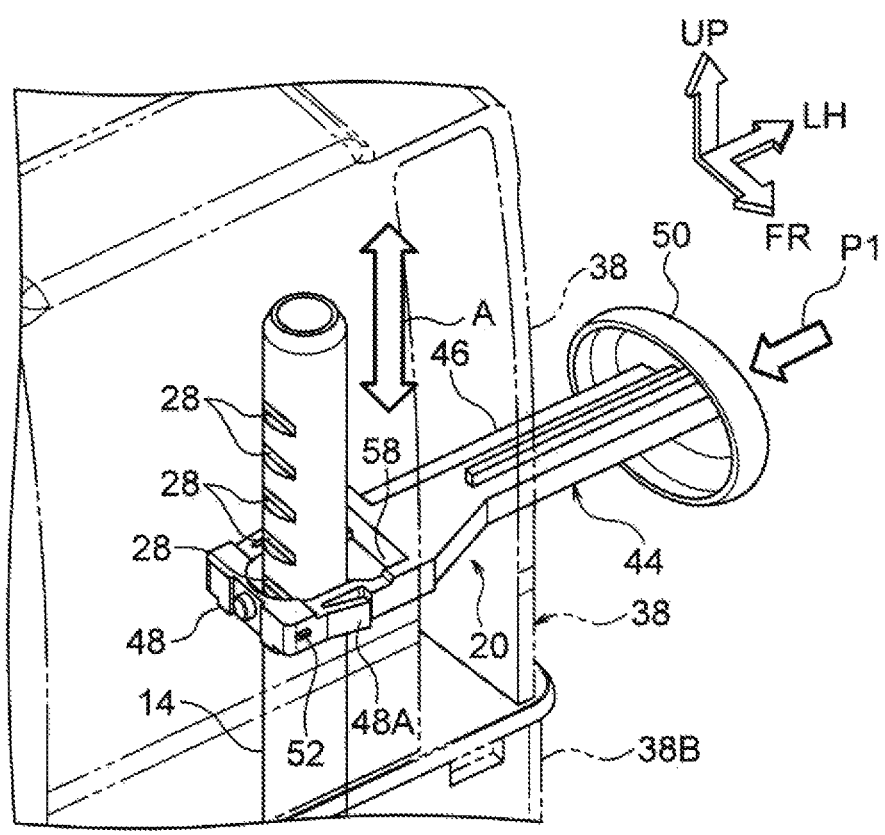
FIG. 5B is a perspective view illustrating an engagement released state between the operating knob and the left headrest stay.
Figure 6A:
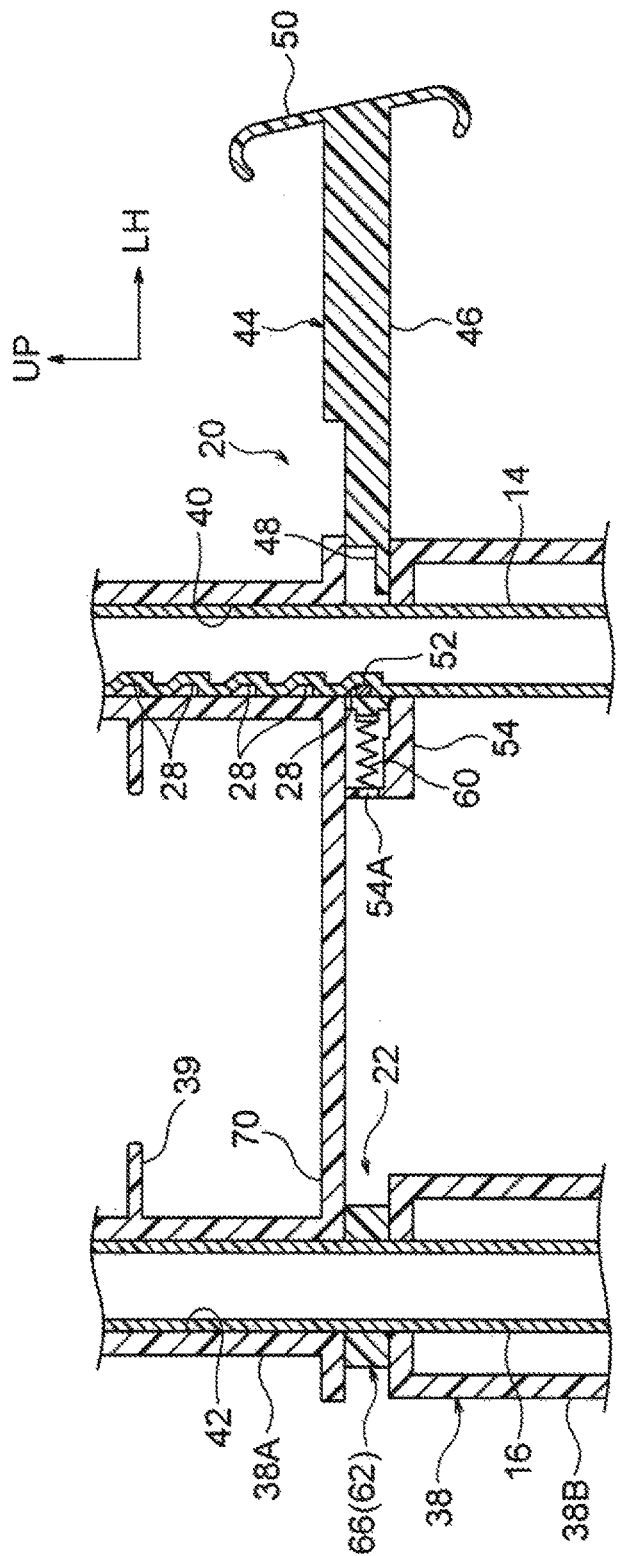
FIG. 6A is a vertical cross-section illustrating the engaged state between the operating knob and the left headrest stay.
Figure 6B:
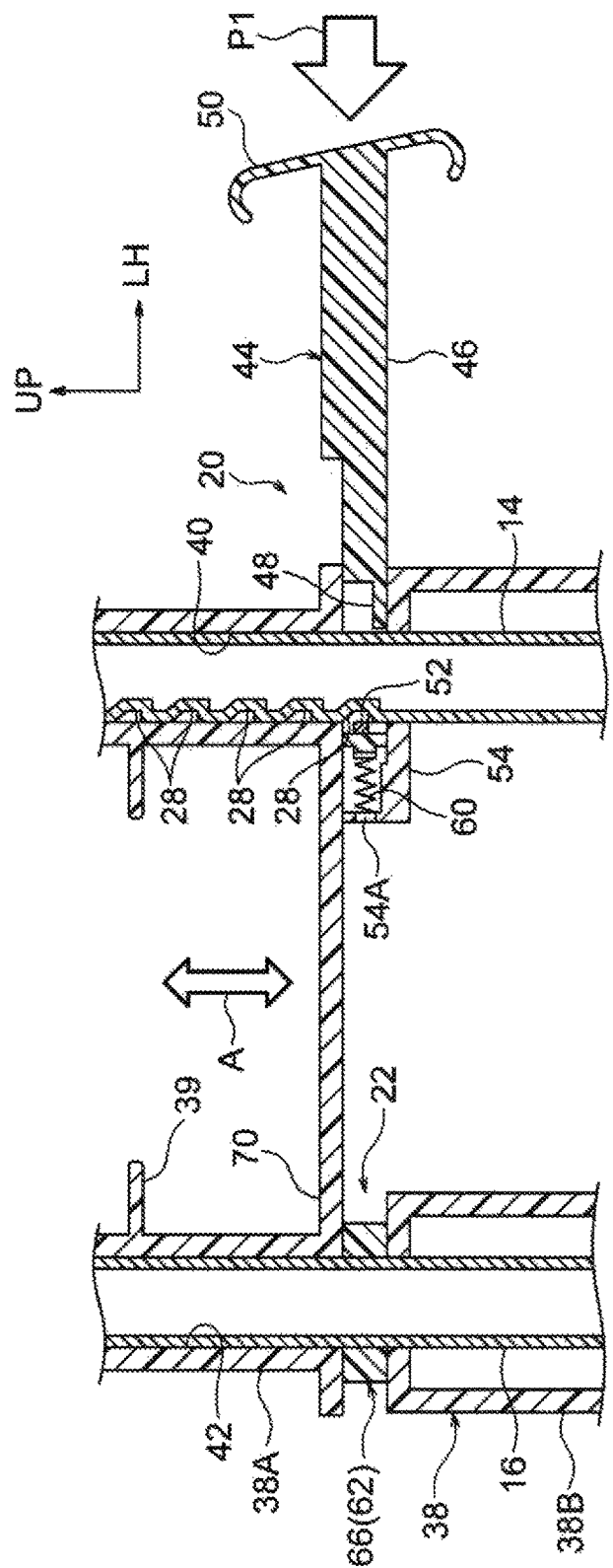
FIG. 6B is a vertical cross-section illustrating the engagement released state between the operating knob and the left headrest stay.
Figure 7A:
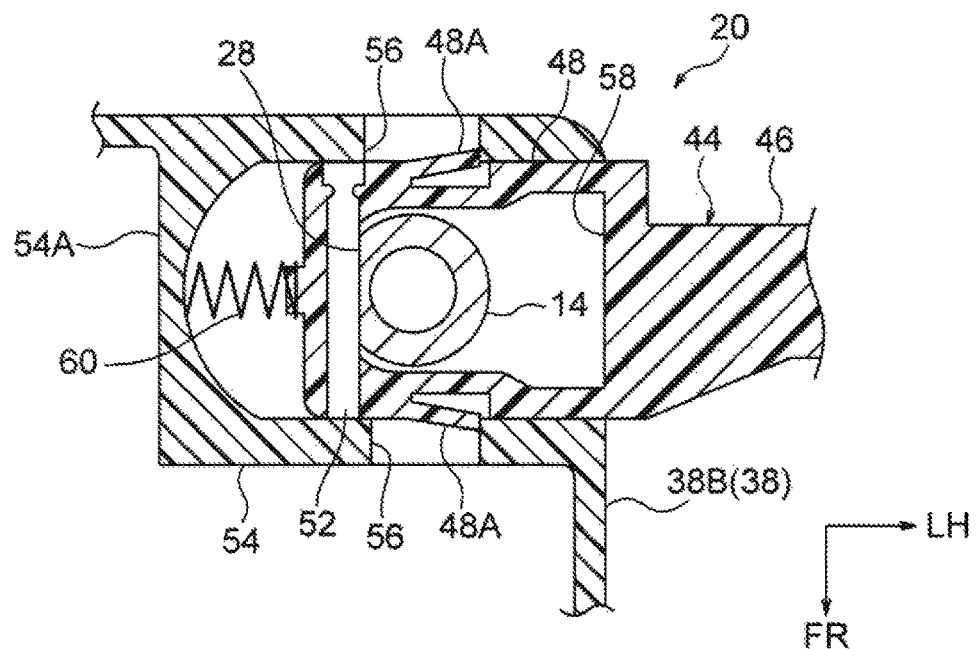
FIG. 7A is a lateral cross-section illustrating the engaged state of the operating knob and the left headrest stay.
Figure 7B:
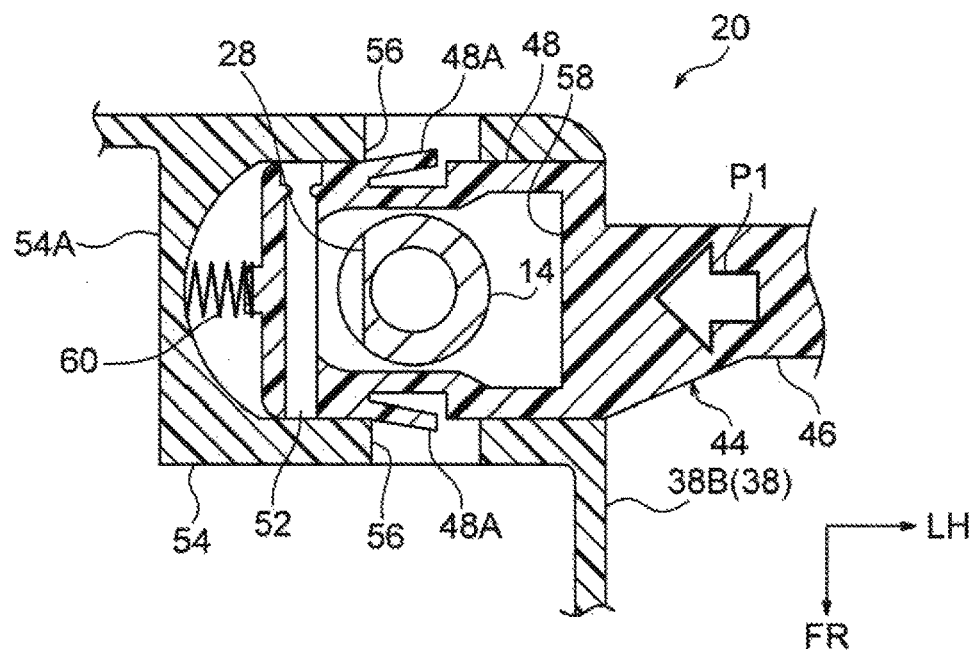
FIG. 7B is a lateral cross-section illustrating the engagement released state of the operating knob and the left headrest stay.

The case 38 integrally includes a substantially box shaped case upper portion 38A open toward the rear of the headrest main body 18, and a substantially box shaped case lower portion 38B open toward the lower side of the headrest main body 18. As illustrated in FIG. 2 and FIG. 4, plural intermediate walls 39 (ribs) are formed in a row along the up-down direction inside the case upper portion 38A, and the case upper portion 38A is reinforced by the intermediate walls 39.

A left and right pair of stay insertion holes 40, 42 (see FIG. 6A, FIG. 6B, FIG. 9A, and FIG. 9B), corresponding to the headrest stays 14, 16, are formed in the case 38. The left and right stay insertion holes 40, 42 pierce through the case 38 along the up-down direction. The left and right headrest stays 14, 16 are inserted into the headrest main body 18 through a left and right pair of through-holes (not illustrated in the drawings) formed in a lower face of the headrest cover 36, and are inserted into the left and right stay insertion holes 40, 42. The headrest main body 18 is thereby supported so as to be capable of moving along the up-down direction (capable of moving up and down) relative to the left and right headrest stays 14, 16.

The height adjustment mechanism 20 is provided in the vicinity of an up-down direction center portion of a left side portion inside the headrest main body 18. The height adjustment mechanism 20 includes an operating knob 44, serving as a limiting member. The operating knob 44 is formed in an elongated shape, and is disposed inside the headrest main body 18 oriented with its length direction running along the left-right direction of the headrest main body 18. The operating knob 44 is configured so as to engage with the left headrest stay 14, thereby limiting up-down movement of the headrest main body 18 relative to the left and right headrest stays 14, 16. Specific explanation follows below.

The operating knob 44 includes an arm portion 46 formed in an elongated, substantially plate shape, a frame shaped lock portion 48 connected to one length direction end portion (a seat width direction center side end portion) of the arm portion 46, and a circular disc shaped operating button portion (adjustment operation portion) 50 that is connected to another length direction end portion (a seat width direction outside end portion) of the arm portion 46, and that is exposed to the outside of the headrest main body 18 at a left side face of the headrest main body 18. The arm portion 46, the lock portion 48, and the operating button portion 50 are integrally formed of resin, for example. The operating knob 44 also includes a metal pin 52 that is attached to the lock portion 48.

A knob support portion 54 that is open at a left side face of the case 38 and corresponds to the operating knob 44, is formed in an up-down direction intermediate portion (an upper end portion of the case lower portion 38B) of the case 38. The lock portion 48 of the operating knob 44 is inserted into the knob support portion 54. The knob support portion 54 is formed so as to surround the lock portion 48 from the up-down direction, the front-rear direction, and the left-right direction center side of the headrest main body 18.

When the lock portion 48 is inserted into the knob support portion 54, claw portions 48A, which are formed to a front face and a rear face of the lock portion 48 and are capable of undergoing elastic deformation, undergo elastic deformation. The claw portions 48A undergo elastic recovery inside anchor holes 56 (see FIG. 3, FIG. 7A, and FIG. 7B) formed to front and rear wall portions of the knob support portion 54, and catch against edge portions of the respective anchor holes 56. The lock portion 48 is thereby restricted from coming out of the knob support portion 54, and the operating knob 44 is supported so as to be capable of moving relative to the case 38 within a specific range along the left-right direction of the headrest main body 18.

A substantially rectangular shaped insertion hole 58 that pierces through the lock portion 48 along the up-down direction is formed in the lock portion 48. The left headrest stay 14 is inserted through the insertion hole 58. The above-described metal pin 52 is attached to an inner peripheral portion of the insertion hole 58. The pin 52 is positioned at the right side (the left-right direction center side of the headrest main body 18) of the left headrest stay 14, and is disposed oriented orthogonally to the left headrest stay 14. The pin 52 faces the seat right side face of the left headrest stay 14. Note that the pin 52 is schematically illustrated in FIG. 2, FIG. 3, and FIG. 6A to FIG. 7B.

A right end face (a face at the opposite side to the arm portion 46) of the lock portion 48 faces an inside wall 54A included in the knob support portion 54. A compression coil spring 60 (not illustrated in FIG. 5A and FIG. 5B) is provided between the inside wall 54A and the right end face of the lock portion 48. The compression coil spring 60 biases the operating knob 44 toward the left side (width direction outside) of the headrest main body 18, and the above-described pin 52 is pressed against the seat right side face (the face formed with the plural notches 28) of the left headrest stay 14. Configuration is such that up-down movement of the headrest main body 18 relative to the left headrest stay 14 and the right headrest stay 16 is limited by fitting the pin 52 together with one of the plural notches 28.

To explain additionally regarding the above limitation, the shape of the plural notches 28 is set such that, in a state in which the pin 52 is fitted together with one of the plural notches 28, movement of the headrest main body 18 toward the lower side relative to the left and right headrest stays 14, 16 is restricted; however, even in this state, movement of the headrest main body 18 toward the upper side relative to the left and right headrest stays 14, 16 is permitted. Namely, an upper side face of each of the plural notches 28 configures a sloped face, such that, when load toward the upper side is applied to the headrest main body 18, the sloped face and the pin 52 slide against each other, and the pin 52 comes out from the respective notch 28.

In a state in which the operating button portion 50 of the operating knob 44 has been press-operated toward the left-right direction center side of the headrest main body 18 against the biasing force of the compression coil spring 60 (see the arrow P1 in FIG. 5B, FIG. 6B, and FIG. 7B), the pin 52 separates from the seat width direction inside face of the left headrest stay 14. In this state, the fitting together of the one of the plural notches 28 and the pin 52 (the engagement between the operating knob 44 and the left headrest stay 14) is released. This enables the height position of the headrest main body 18 relative to the left and right headrest stays 14, 16 to be adjusted (changed) (see the arrow A in FIG. 5B and FIG. 6B).

The removal restricting mechanism 22 is provided to a right side portion inside the headrest main body 18. The removal restricting mechanism 22 includes a concealed lock 62 serving as a restricting member, and a release button 64 serving as a release member. The concealed lock 62 is provided in the vicinity of an up-down direction center portion of the right side portion of the headrest main body 18. The concealed lock 62 is formed of resin in an elongated frame shape, and is configured by a lock main body 66 disposed oriented with its length direction running along the front-rear direction of the headrest main body 18, and a metal pin 68 attached to the lock main body 66. Configuration is such that, by engaging the concealed lock 62 with the right headrest stay 16, removal of the headrest main body 18 from the left and right headrest stays 14, 16 is restricted. Specific explanation follows below.

A lock support portion 70 that is open at a back face (rear face) of the case 38 and corresponds to the concealed lock 62 is formed at the up-down direction intermediate portion (the upper end portion of the case lower portion 38B) of the case 38. The concealed lock 62 is inserted into the lock support portion 70. The lock support portion 70 is formed so as to surround the concealed lock 62 from the up-and-down directions, left-and-right directions, and front side of the headrest main body 18.

When the concealed lock 62 is inserted into the lock support portion 70, claw portions 66A, which are formed to a left face and a right face of the lock main body 66 and are capable of undergoing elastic deformation, undergo elastic deformation. The claw portions 66A undergo elastic recovery inside anchor holes 72 (see FIG. 3) formed to left and right wall portions of the lock support portion 70, and catch on edge portions of the respective anchor holes 72. The concealed lock 62 is thereby restricted from coming out of the lock support portion 70, and the concealed lock 62 is supported so as to be capable of moving relative to the case 38 within a specific range in the front-rear direction of the headrest main body 18.

A substantially rectangular shaped through-hole 74 that pierces through the lock main body 66 in the up-down direction is formed in the lock main body 66. The right headrest stay 16 is inserted through the through-hole 74. The above-described metal pin 68 is attached to an inner peripheral portion of the through-hole 74. The pin 68 is positioned at the front side of the headrest main body 18 with respect to the right headrest stay 16, and is disposed oriented orthogonally to the right headrest stay 16. The pin 68 faces the seat front side face of the right headrest stay 16. Note that the pin 68 is schematically illustrated in FIG. 2, FIG. 3, FIG. 9A, and FIG. 9B.

A cam portion 66B, positioned further to the seat front side than the right headrest stay 16, is provided at a front portion of the lock main body 66. A sloped face 76 that faces the lower side and rear side of the headrest main body 18 is formed to the cam portion 66B. The sloped face 76 is sloped so as to be oriented toward the upper side of the headrest main body 18 on progression toward the rear side of the headrest main body 18. The sloped face 76 corresponds to the release button 64.

A front end face of the lock main body 66 faces a front wall 70A included in the lock support portion 70. A compression coil spring 78 is provided between the front wall 70A and a front end face of the concealed lock 62. The compression coil spring 78 biases the concealed lock 62 toward the rear side of the headrest main body 18, and the above-described pin 68 presses against the seat front side face (the face formed with the upper and lower pair of notches 30, 32) of the right headrest stay 16. By fitting the pin 68 together with the upper side notch 30, the headrest main body 18 is restricted from moving toward the upper side relative to the right headrest stay 16. Configuration is thereby such that the headrest main body 18 is restricted from being removed from the left and right headrest stays 14, 16.

However, the shape of the upper side notch 30 is set such that, even in a state in which the pin 68 is fitted together with the upper side notch 30, movement of the headrest main body 18 toward the lower side relative to the left and right headrest stays 14, 16 is permitted. Similarly, the shape of the lower side notch 32 is set such that, in a state in which the pin 68 is fitted together with the lower side notch 32, movement of the headrest main body 18 toward the lower side relative to the right headrest stay 16 is restricted; however, even in this state, movement of the headrest main body 18 toward the upper side relative to the right headrest stay 16 is permitted.

The upper side notch 30 is positioned further toward the seat upper side than the notch 28 out of the above-described plural notches 28 that is positioned furthest toward the seat upper side, and the lower side notch 32 is positioned further toward the seat lower side than the notch 28 out of the above-described plural notches 28 that is positioned furthest toward the seat lower side. Configuration is thereby such that, in a state in which the headrest main body 18 is positioned at a height at which the pin 52 of the operating knob 44 fits together with one of the plural notches 28, the pin 68 of the concealed lock 62 does not fit together with the upper or lower notches 30, 32.

The release button 64 is formed of resin in an elongated plate shape, and is provided below a front end portion of the concealed lock 62 oriented with its length direction running along the up-down direction of the headrest main body 18, and with its thickness direction running along the front-rear direction of the headrest main body 18.

A button support portion 80, that is open toward the lower side of the case 38 and corresponds to the release button 64, is formed in the case lower portion 38B. The release button 64 is inserted into the button support portion 80 from the lower side. The button support portion 80 is formed so as to surround the release button 64 from the front-and-rear directions and the left-and-right directions of the headrest main body 18.

When the release button 64 is inserted into the button support portion 80, claw portions 64A, which are formed to a left face and a right face of the release button 64 and are capable of undergoing elastic deformation, undergo elastic deformation. The claw portions 64A undergo elastic recovery inside anchor holes 82 (see FIG. 8A and FIG. 8B; the left side anchor hole 82 is not illustrated in the drawings) formed to left and right wall portions of the button support portion 80, and catch on edge portions of the respective anchor holes 82. The release button 64 is thereby restricted from coming out of the button support portion 80, and the release button 64 is supported so as to be capable of moving relative to the case 38 within a specific range along the up-down direction of the headrest main body 18.

An upper end portion of the release button 64 abuts the sloped face 76 of the concealed lock 62 previously described. A lower end portion of the release button 64 configures a release operation portion 64B. The release operation portion 64B is positioned inside the headrest main body 18, in close proximity above a lower face of the headrest main body 18 (the lower face of the headrest cover 36).

Figure 8A:
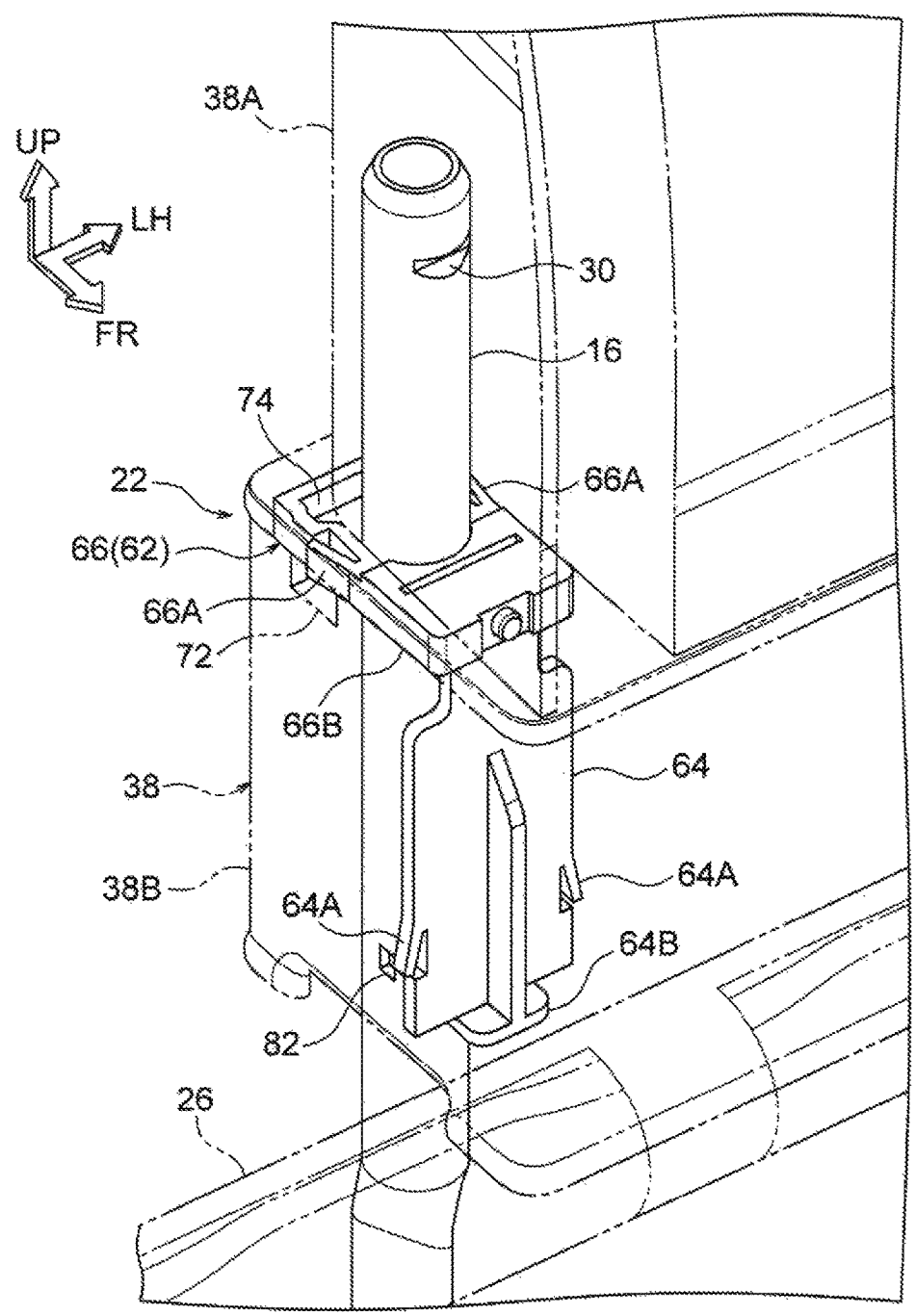
FIG. 8A is a perspective view illustrating an engaged state of a concealed lock included in a removal restricting mechanism of a headrest device according to the first exemplary embodiment, and a right headrest stay.
Figure 8B:
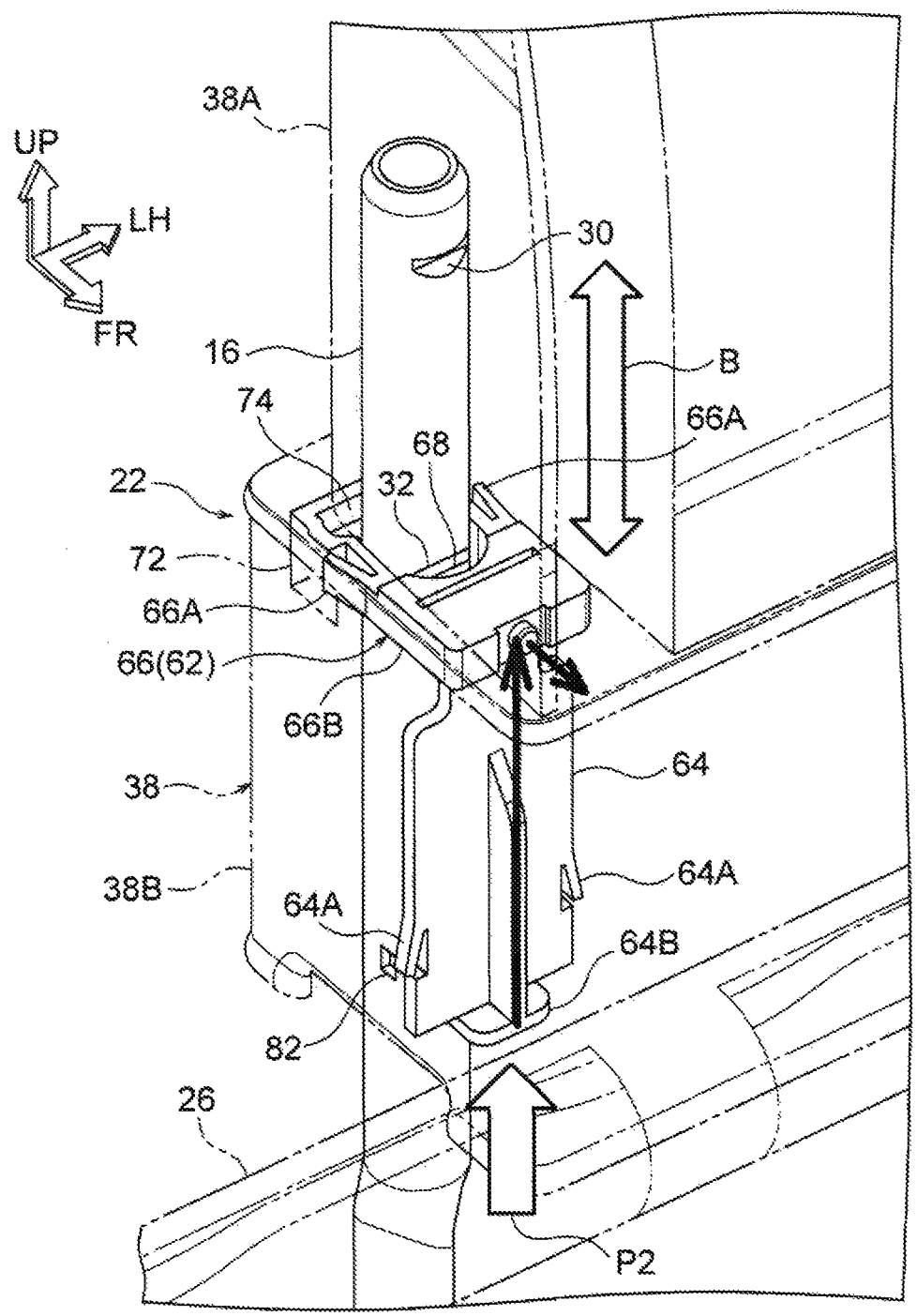
FIG. 8B is a perspective view illustrating an engagement released state between the concealed lock and the right headrest stay.
Figure 9A:
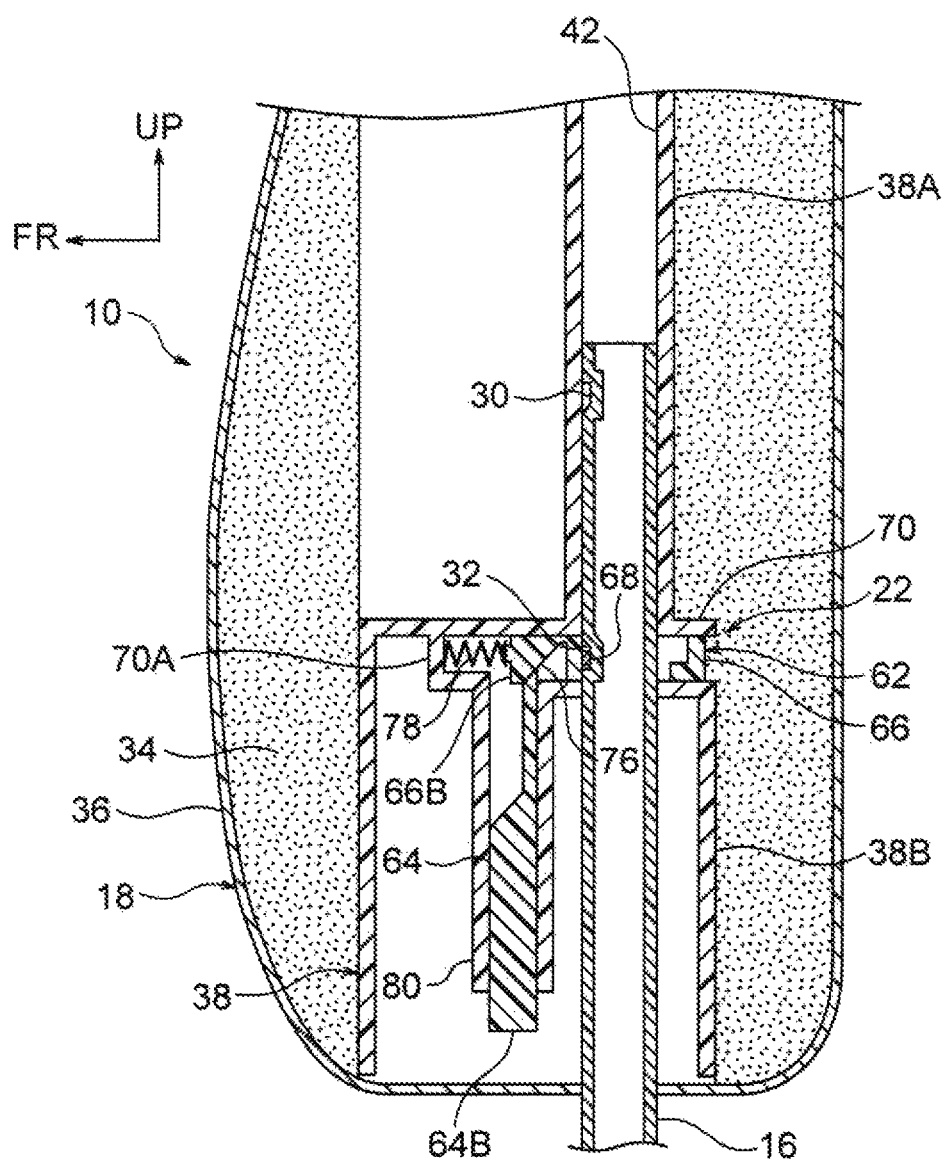
FIG. 9A is a vertical cross-section illustrating the engaged state of the concealed lock and the right headrest stay.

As illustrated by the arrow P2 in FIG. 8B and FIG. 9B, when the release operation portion 64B is press-operated from the lower face side of the headrest main body 18 toward the upper side, the concealed lock 62, in which the upper end portion of the release button 64 is engaged with the sloped face 76, moves toward the front side of the headrest main body 18 against the biasing force of the compression coil spring 78. The pin 68 thereby separates from the seat front side face of the right headrest stay 16, and the engagement between the concealed lock 62 and the right headrest stay 16 is released. In this engagement released state, namely, in a state in which the release button 64 is being press-operated, the removal restriction on the headrest main body 18 by the removal restricting mechanism 22 is released. The headrest main body 18 is capable of being detached and attached to the left and right headrest stays 14, 16 in this state (see the arrow B in FIG. 8B and FIG. 9B).

Operation and Advantageous Effects

Explanation follows regarding operation and advantageous effects of the present exemplary embodiment.

In the headrest device 10 with the above configuration, the removal restricting mechanism 22 that restricts removal of the headrest main body 18 from the left and right headrest stays 14, 16 is provided inside the headrest main body 18. In the removal restricting mechanism 22, removal of the left and right headrest stays 14, 16 from the headrest main body 18 is restricted by engaging the concealed lock 62 positioned inside the headrest main body 18 with the right headrest stay 16.

When the release operation portion 64B of the release button 64 positioned inside the headrest main body 18 is press-operated from the outside (lower side) of the headrest main body 18, the engagement between the concealed lock 62 and the right headrest stay 16 is released. The headrest main body 18 can thereby be removed from the left and right headrest stays 14, 16 (namely, the seatback 24), thereby contributing to securing ease of maintenance.

Namely, for example, if the removal restricting mechanism 22 did not include the release button 64, when the headrest main body 18 was removed from the seatback 24, the seatback or the headrest main body 18 would need to be disassembled or the like, such that maintenance would be extremely complicated. Regarding this point, in the present exemplary embodiment, the headrest main body 18 can be removed from the seatback 24 by operating the release button 64 during maintenance, thereby enabling maintenance to be made easier.

In the present exemplary embodiment, the release operation portion 64B of the release button 64 is positioned inside the headrest main body 18, thereby enabling the existence of the release operation portion 64B to be made unnoticeable to a user. This contributes to preventing the headrest main body 18 from being removed by a user.

In the present exemplary embodiment, the release operation portion 64B of the release button 64 is configured so as to be press-operated from the lower face side of the headrest main body 18, thereby enabling the release operation portion 64B to be made difficult to be press-operated by a user, although the operation itself is simple. Even in cases in which, for example, a marker is applied to the surface of the headrest main body 18 (the headrest cover 36) in order for an operator performing maintenance to recognize the position of the release operation portion 64B, this marker can be made difficult to be noticed to a user when applied to the lower face of the headrest main body 18.

Note that it is conceivable that, as in general vehicle seats, the left and right headrest stays 14, 16 might be configured coupled to the seatback frame 26 through tube shaped holders referred to as headrest supports. In such cases, the headrest main body 18 would be removed from the seatback 24 by operating a lock release button provided to the headrest supports, thereby enabling ease of maintenance to be secured. However, the headrest main body 18 would be rendered easily removable by a user. Moreover, the addition of the headrest supports, brackets to support the headrest supports, and the like at the seatback 24 side would increase the number of components. Regarding this point, the present exemplary embodiment contributes to preventing the headrest main body from being removed by a user as previously described, and, since there is no need for the above-described headrest supports or the like, also contributes to reducing the number of components.

In the present exemplary embodiment, configuration is such that the concealed lock 62 of the removal restricting mechanism 22 is only engaged with one (the right headrest stay 16) out of the left and right headrest stays 14, 16, thereby enabling the structure to be simplified compared to a configuration in which the concealed lock 62 is engaged with both headrest stays 14, 16.

In the present exemplary embodiment, the height adjustment mechanism 20 provided inside the headrest main body 18 includes the operating knob 44. Up-down movement of the headrest main body 18 relative to the left and right headrest stays 14, 16 is limited due to the operating knob 44 engaging with the left headrest stay 14. The operating knob 44 includes the operating button portion 50 that is exposed at the outside of the headrest main body 18 at the side face of the headrest main body 18. When the operating button portion 50 is press-operated, the engagement between the operating knob 44 and the left headrest stay 14 is released. Thus, up-down movement of the headrest main body 18 relative to the left and right headrest stays 14, 16 is permitted, enabling the height position of the headrest main body 18 to be adjusted.

In this manner, in the present exemplary embodiment, the operating button portion 50 of the operating knob 44 is provided to the side face of the headrest main body 18, thereby enabling the operating button portion 50 to be press-operated, and the height position of the headrest main body 18 to be adjusted, in a state in which a user (occupant) remains seated in the vehicle seat 12. This enables the height position adjustment of the headrest main body 18 to be made easier.

In the present exemplary embodiment, configuration is such that the operating knob 44 only engages with the other (the left headrest stay 14) out of the left and right headrest stays 14, 16, thereby enabling the structure to be simpler than a configuration in which the operating knob 44 engages with both headrest stays 14, 16.

Note that, as in the headrest described in the Related Art, in a configuration in which a lock spring provided inside a headrest main body engages with both left and right headrest stays, it is difficult to secure lock spring synchronization with respect to the left and right headrest stays. Namely, the lock spring regulation is required so as to engage with the left and right headrest stays in the same manner, such that design and manufacturing become complicated. Moreover, there is a need to have a certain degree of play between the respective members in order to secure this synchronization, such that the generation of abnormal noise caused by this play becomes an issue. Regarding this point, in the present exemplary embodiment, configuration is such that the operating knob 44 only engages with the left headrest stay 14, such that the above-described issue of securing synchronization and issue of abnormal noise generation can be eliminated.

Second Exemplary Embodiment

Explanation follows regarding a second exemplary embodiment of the present invention. Note that configuration and operation that is basically the same as the first exemplary embodiment are appended with the same reference numerals as the first exemplary embodiment, and explanation thereof is omitted.

Figure 11B:
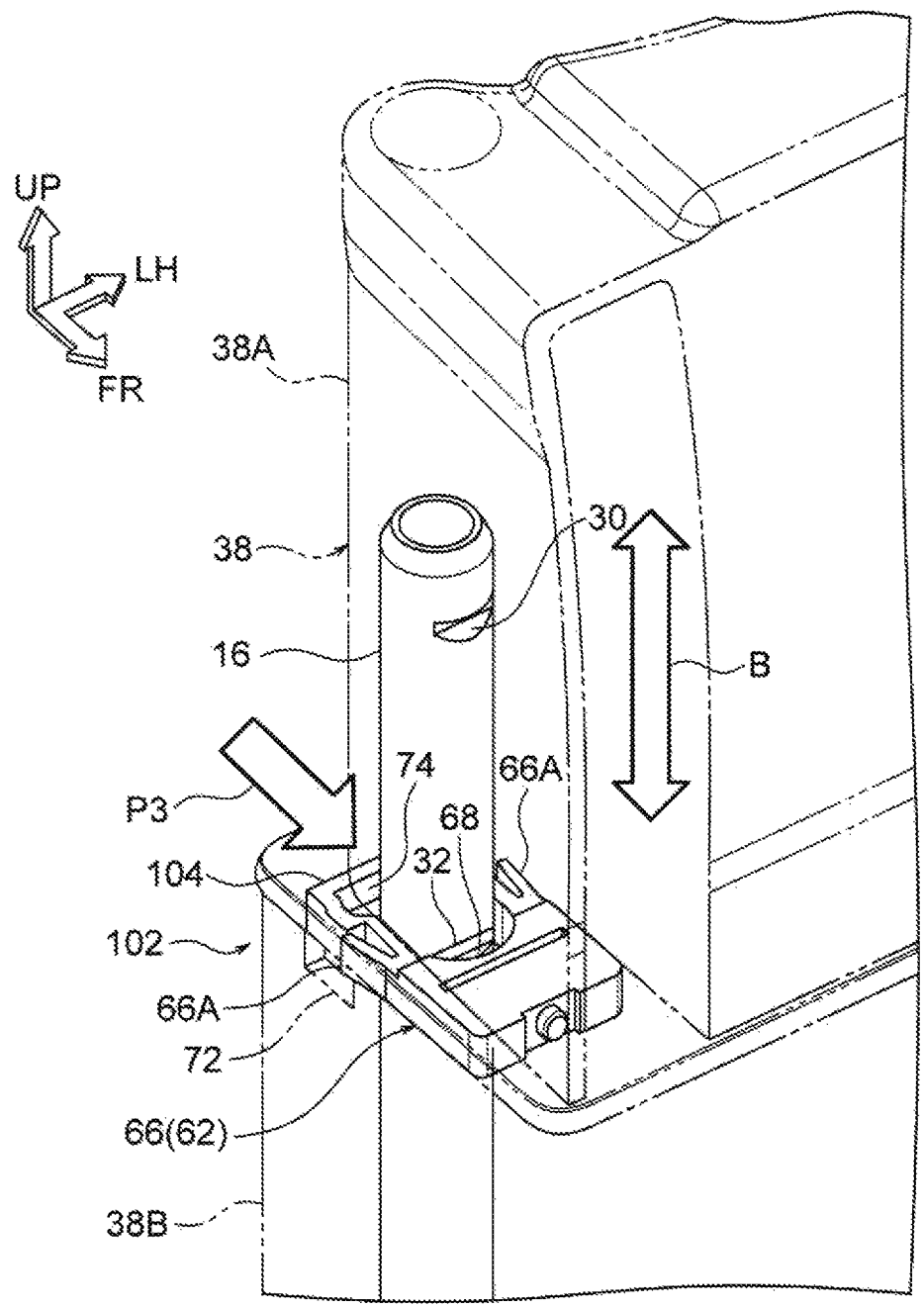
FIG. 11B is a perspective view illustrating an engagement released state between the concealed lock and the right headrest stay.
Figure 12A:
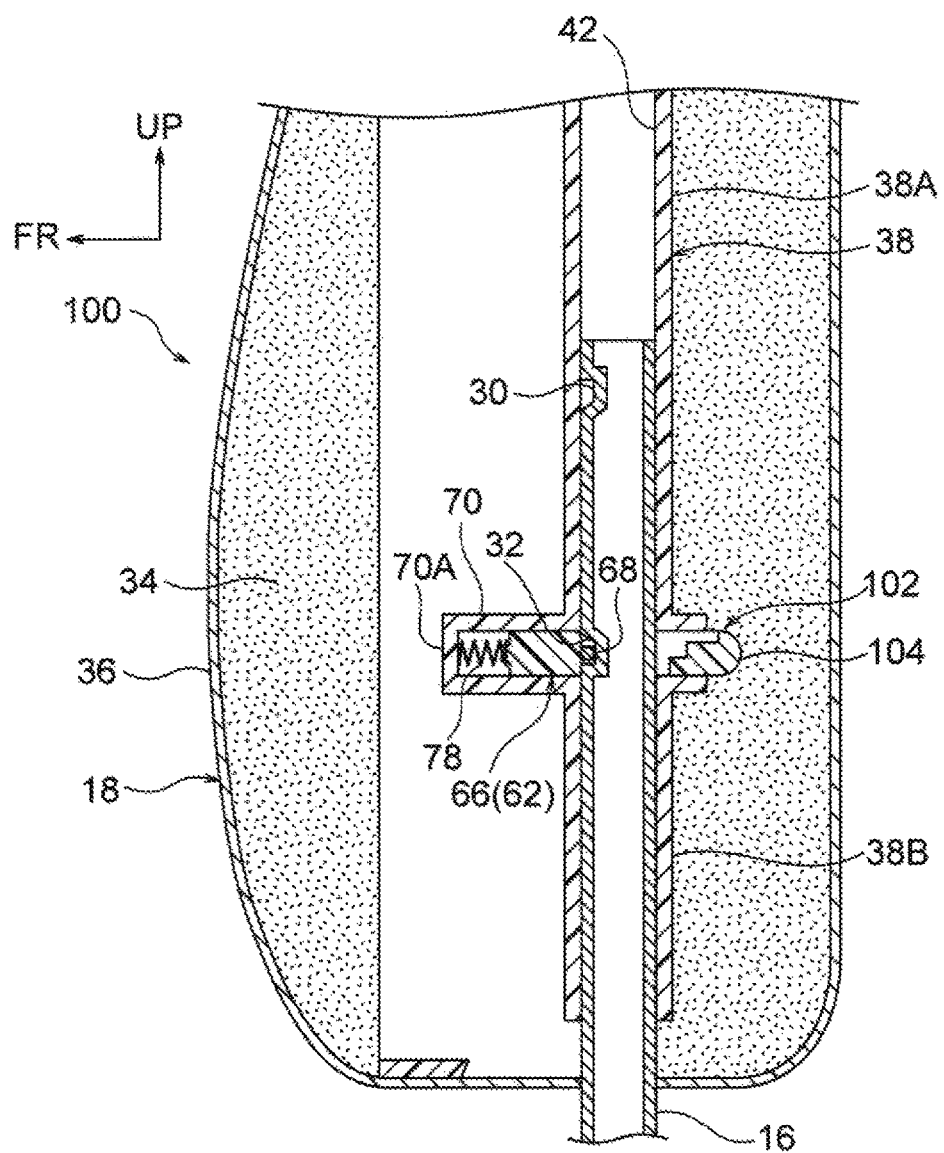
FIG. 12A is a vertical cross-section illustrating the engaged state of the concealed lock and the right headrest stay.

FIG. 10 is a perspective view illustrating a headrest device 100 according to the second exemplary embodiment of the present invention, and part of the seatback frame 26. FIG. 11A is a perspective view illustrating an engaged state between the concealed lock 62 included in a removal restricting mechanism 102 of the headrest device 100 and the right headrest stay 16, and FIG. 11B is a perspective view illustrating an engagement released state between the concealed lock 62 and the right headrest stay 16. FIG. 12A is a vertical cross-section illustrating the engaged state between the concealed lock 62 and the right headrest stay 16, and FIG. 12B is a vertical cross-section illustrating the engagement released state between the concealed lock 62 and the right headrest stay 16.

As illustrated in FIG. 10 to FIG. 12B, the release button 64 according to the first exemplary embodiment is omitted from the removal restricting mechanism 102 according to the present exemplary embodiment. In the present exemplary embodiment, a rear end portion of the lock main body 66 of the concealed lock 62 configures a release operation portion 104, and the cam portion 66B (sloped face 76) according to the first exemplary embodiment is omitted.

In the present exemplary embodiment, when the headrest main body 18 is being removed from the left and right headrest stays 14, 16, the release operation portion 104 is press-operated from a back face side of the headrest main body 18 toward the front side of the headrest main body 18 (see the arrow P3 in FIG. 11B and FIG. 12B). The pin 68 is thereby separated from the seat front side face of the right headrest stay 16, and the engagement between the concealed lock 62 and the right headrest stay 16 is released. In this engagement released state (a press-operated state of the release operation portion 104), the headrest main body 18 is capable of being attached to, and detached from, the left and right headrest stays 14, 16 (see the arrow B in in FIG. 11B and FIG. 12B). Other configuration is similar to that in the first exemplary embodiment.

Similarly to in the first exemplary embodiment, the present exemplary embodiment also contributes to preventing the headrest main body 18 from being removed by a user, and to securing ease of maintenance. Moreover, in the present exemplary embodiment, a rear end portion of the concealed lock 62 (restricting member) configures the release operation portion 104, and the release button 64 is omitted, thereby enabling the structure of the removal restricting mechanism 102 to be simplified.

Note that in each of the above exemplary embodiments, configuration is such that the height adjustment mechanism 20 is provided at the left side portion of the headrest main body 18, and the removal restricting mechanism 22, 102 is provided at the right side portion of the headrest main body 18. However, the present invention is not limited thereto, and a configuration may be applied in which a height adjustment mechanism and a removal restricting mechanism are disposed on opposite left and right sides to those of the above exemplary embodiments.

Various other modifications of the present invention may be implemented without departing from the spirit thereof. Obviously the scope of rights of the present invention is not limited to the above exemplary embodiments.

What is claimed is:

1. A headrest device comprising:
   a left and right pair of headrest stays that are fixed to a seatback frame in a state projecting out toward an upper side of a seatback of a vehicle seat;
   a headrest main body that has the pair of headrest stays inserted inside from a lower face of the headrest main body and that is supported by the pair of headrest stays; and
   a removal restricting mechanism that is provided inside the headrest main body, that restricts removal of the headrest main body from the pair of headrest stays, and that enables the removal of the headrest main body from the pair of headrest stays by a release operation portion positioned inside the headrest main body being press-operated from an outside of the headrest main body,
   wherein:
   the removal restricting mechanism comprises a restricting member that restricts the removal of the headrest main body by engaging with one of the pair of headrest stays,
   the restricting member is released from engagement with the one of the pair of headrest stays by press-operation of the release operation portion, and
   the removal restricting mechanism comprises a release member having an upper end portion that engages with the restricting member and having a lower end portion that configures the release operation portion and is press-operated from a lower face side of the headrest main body.

2. The headrest device of claim 1, further comprising:
   a height adjustment mechanism that is provided inside the headrest main body in order to adjust a height position of the headrest main body with respect to the pair of headrest stays, wherein:

the height adjustment mechanism comprises a limiting member that limits up-down movement of the headrest main body with respect to the pair of headrest stays by engaging with the other of the pair of headrest stays, and the engagement of the limiting member with the other of the pair of headrest stays is released by an adjustment operation portion that is exposed to the outside of the headrest main body being press-operated.

3. A headrest device comprising:

a left and right pair of headrest stays that are fixed to a seatback frame in a state projecting out toward an upper side of a seatback of a vehicle seat;

a headrest main body that has the pair of headrest stays inserted inside from a lower face of the headrest main body and that is supported by the pair of headrest stays;

a removal restricting mechanism that is provided inside the headrest main body, that restricts removal of the headrest main body from the pair of headrest stays, and that enables removal of the headrest main body from the pair of headrest stays by a release operation portion positioned inside the headrest main body being press-operated from an outside of the headrest main body; and a height adjustment mechanism that is provided inside the headrest main body in order to adjust a height position of the headrest main body with respect to the pair of headrest stays, wherein:

the removal restricting mechanism comprises a restricting member that restricts the removal of the headrest main body by engaging with one of the pair of headrest stays, the restricting member is released from engagement with the one of the pair of headrest stays by press-operation of the release operation portion, a rear end portion of the restricting member configuring the release operation portion is press-operated from a back face side of the headrest main body, the release operation portion is concealed within the headrest main body, the removal restricting mechanism enables removal of the headrest main body from the pair of headrest stays by a region of a back face of the headrest main body, which corresponds to a position of the rear end portion of the restricting member, being press-operated from an outside of the headrest main body, the removal restricting mechanism does not enable removal of the headrest main body from the pair of headrest stays by other regions of the back face of the headrest main body being press-operated from the outside of the headrest main body, the height adjustment mechanism comprises a limiting member that limits up-down movement of the headrest main body with respect to the pair of headrest stays by engaging with the other of the pair of headrest stays, and the engagement of the limiting member with the other of the pair of headrest stays is released by an adjustment operation portion that is exposed to the outside of the headrest main body being press-operated.

4. A headrest device comprising:

a left and right pair of headrest stays that are fixed to a seatback frame in a state projecting out toward an upper side of a seatback of a vehicle seat;

a headrest main body that has the pair of headrest stays inserted inside from a lower face of the headrest main body and that is supported by the pair of headrest stays; and a removal restricting mechanism disposed inside the headrest main body and comprising a restricting member and a release member, the release member having an upper end portion that engages with the restricting member and a lower end portion defining a release operation portion positioned inside the headrest main body, the restricting member being configured to restrict removal of the headrest main body by engaging with one of the pair of headrest stays, and enable the removal of the headrest main body from the pair of headrest stays by pressing the lower face side of the headrest main body to actuate the release operation portion.

* * * * *